United States Patent
Hoen

(10) Patent No.: US 6,541,892 B2
(45) Date of Patent: Apr. 1, 2003

(54) ACTUATOR WITH A FLEXURE ARRANGEMENT TO ACCOMMODATE A LONG RANGE OF MOTION

(75) Inventor: Storrs T. Hoen, Bridbane, CA (US)

(73) Assignee: Agilent Technologies, Inc., Palo Alto, CA (US)

( * ) Notice: Subject to any disclaimer, the term of this patent is extended or adjusted under 35 U.S.C. 154(b) by 159 days.

(21) Appl. No.: 09/761,305

(22) Filed: Jan. 16, 2001

(65) Prior Publication Data

US 2002/0093251 A1 Jul. 18, 2002

(51) Int. Cl.[7] .................................................. H02N 1/00
(52) U.S. Cl. ....................................................... 310/309
(58) Field of Search ...................... 310/309; 361/283.3; 360/294.2; 73/504.12; 359/871, 872

(56) References Cited

U.S. PATENT DOCUMENTS

| 5,177,348 A | | 1/1993 | Laor ........................ 250/201.1 |
| 5,378,954 A | | 1/1995 | Higuchi et al. ............. 310/309 |
| 5,524,153 A | | 6/1996 | Laor ........................... 385/16 |
| 5,534,740 A | | 7/1996 | Higuchi et al. ............. 310/309 |
| 5,621,829 A | | 4/1997 | Ford ........................... 385/22 |
| 5,862,003 A | * | 1/1999 | Saif et al. .................... 359/223 |
| 5,908,986 A | * | 6/1999 | Mitamura ................. 73/504.12 |
| 5,986,381 A | * | 11/1999 | Hoen et al. .................. 310/309 |
| 6,257,739 B1 | * | 7/2001 | Sun et al. ..................... 362/259 |
| 6,308,573 B1 | * | 10/2001 | Lee et al. ..................... 310/309 |
| 6,355,534 B1 | * | 3/2002 | Cheng et al. ............... 29/25.42 |
| 6,424,504 B1 | * | 7/2002 | Abe et al. .................... 310/309 |

FOREIGN PATENT DOCUMENTS

JP          5-22960      *  1/1993     ............ H02N/1/00

* cited by examiner

*Primary Examiner*—Karl Tamai

(57) ABSTRACT

An actuator is formed by using at least one flexure that is continuously flexible between a rigid connection to a stator and a rigid connection to a translator. The one or more continuously flexible flexures provide a long range of translator motion when combined with an electrostatic levitation arrangement. In selected embodiments, the flexures that are continuously flexible are straight beam flexures, so as to provide a high degree of stiffness. In other embodiments, the flexures are pre-bent to provide a longer switching throw from a relaxed state. Where the translator is required to be displaced in a generally straight-line direction, some off-axis displacement will occur, but is preferably accompanied by a stepping of a levitation voltage pattern. In another embodiment one and only one straight beam flexure is used and the levitator is caused to rotate about a rotational axis that is intersected by the one straight beam flexure.

20 Claims, 13 Drawing Sheets

ACTUATOR WITH A FLEXURE ARRANGEMENT TO ACCOMMODATE A LONG RANGE OF MOTION

TECHNICAL FIELD

The invention relates generally to actuators and more particularly to flexural arrangements for supporting a movable member for controlled long range motion relative to a stationary member.

BACKGROUND ART

In many micromachine applications that use actuators, design goals include providing a long range of translator motion along a particular axis, while retarding out-of-plane displacements and in-plane displacements that are perpendicular to the intended direction of travel. Electrostatic surface actuators for use in micromachine applications are known. Such actuators may be used in advanced data storage applications and optical telecommunications applications. U.S. Pat. No. 5,986,381 to Hoen et al., which is assigned to the assignee of the present invention, describes electrostatic actuators and voltage variation techniques for driving a translator relative to a stator. U.S. Pat. No. 5,378,954 to Higuchi et al. also describes electrostatic actuators.

All of the actuators displace one element (i.e., the translator) relative to another element (i.e., the stator) and require that the moving element be stabilized against motions in undesired directions. Rolling or sliding elements are most commonly used to directionally stabilize the translator. However, in micromachined actuators, bending flexures are preferred, since the surface contact associated with the rolling or sliding elements is particularly unpredictable and risky for extremely small devices. Nevertheless, bending flexures pose different problems, since their stiffness varies with displacement. For a unidirectional actuator, the bending flexures must stabilize the translator with respect to the out-of-plane motions and with respect to the in-plane motions perpendicular to the desired direction of travel. Supports that are rigid against out-of-plane displacements are particularly important for electrostatic surface actuators, because the force tending to attract the two surfaces is approximately the same as the force pushing the translator parallel to the stator.

FIG. 1 shows an example of one type of folded beam flexure 10 that is used in micromachined electrostatic actuator applications. The flexural device includes a rigid floating beam 12 having opposite sides connected to flexible beams 14 and 16. The flexible beams 14 and 16 are anchored to supports 18 and 20 on a stationary member (not shown), such as a semiconductor substrate. In addition to the pair of flexible beams 14 and 16, there is a second pair of flexible beams 22 and 24 connected to the rigid floating beam 12. The second pair of flexible beams supports a second rigid beam 26, which moves with the movable member of interest.

The folded beam flexure 10 of FIG. 1 produces generally straight-line motion along an x axis. However, as the second rigid beam 26 is displaced along the x axis, the flexible beams 14, 16, 22 and 24 become increasingly compliant to forces along the y axis. For many electrostatic actuators, such as comb drives and surface drives, the applied force in the desired direction of motion (i.e., along the x axis) is accompanied by an instability in the y axis direction. The maximum stable travel of the second rigidly floating beam 26 is thus limited to when the y axis force gradient exceeds the y axis stiffness of the flexible beams.

A second known flexural device 28 is shown in FIG. 2. Here, the translator is connected directly to the rigid floating beam 12 that is connected to the stator (not shown) via the two flexible beams 14 and 16. This device is better suited for maintaining stiffness along the y axis as the rigid beam is displaced. Unfortunately, motion of the rigid floating beam does not follow a straight line as it is displaced. This is not suitable for use in actuators that require straight-line motion.

FIG. 3 shows a third known flexural device 30 which uses micromachine flexible beams. A series of pre-bent flexible beams 32, 34, 36, 38, 40, 42, 44 and 46 is used to provide increased stiffness to motion along the y axis. The flexible beams 32, 34, 36 and 38 are anchored to supports 50 at one end and are connected to either a first rigid floating beam 48 or a second rigid floating beam 52 at the opposite ends. The supports 50 are locations on a stationary member, such as a semiconductor wafer. The flexible beams 40 and 42 connect the first rigid floating beam 48 to a third floating member 54, while the flexible beams 44 and 46 connect the second rigid floating beam to the third floating member.

The flexible beams 32, 36, 42 and 44 are pre-bent in such a way that the ends opposite to the rigid floating beams 48 and 52 are offset in a "negative direction" along the x axis with respect to the connections to the rigid floating beams. On the other hand, the flexible beams 34, 38, 40 and 46 are pre-bent in such a way that the ends opposite to the rigid floating beams 48 and 52 are offset in a "positive direction" along the x axis with respect to the connections to the rigid floating beams. Because of the difference in pre-bent conditions, as one set of flexible beams softens with increased bending, the other set is straightening, thereby maintaining the y axis stiffness. More particularly, as the third floating member 54 which is connected to the translator moves in the positive x direction, the flexible beam 44 will begin to straighten, while the flexible beam 46 will become increasingly bent. This has the effect of causing the third floating member 54 to rotate in a clockwise direction. However, for the same motion, the flexible beam 40 will become increasingly bent and the flexible beam 42 will straighten, causing the third floating member to be urged in a counterclockwise rotation. The two rigid floating beams 48 and 52 are linked at their centers by a bending flexure 56 that acts as a torsional joint. Because each side of the third floating beam 54 is acted upon by offsetting rotational forces, the third floating beam 54 moves in a straight-line motion.

There are some concerns with the flexural device 30 of FIG. 3. First, it does not efficiently use semiconductor wafer area, which is often times at a premium. Second, the flexural device 30 requires contacts to rigid supports 50 which are sometimes fully surrounded by the various beams. Thus, it may be difficult to fabricate the device using a single material layer without external supports, as is often preferred with deep reactive ion etching.

A more complete flexural system 58 that utilizes folded beam arrangements 60 and 62 is shown in FIGS. 4 and 5.

Each of the folded beam arrangements 60 and 62 is identical to the one described with reference to FIG. 1, but with a translator 64 taking the place of the second rigid beam 26. The system 58 is shown in a relaxed state in FIG. 4. In this state, the flexible beams 14, 16, 22 and 24 are generally perpendicular to the floating rigid beams 12. As noted above, the flexible beams 14 and 16 are anchored to supports 18 and 20, respectively, on the stationary substrate 65, which is represented by dashed lines. The flexible beams 22 and 24 are connected between the rigid floating beams 12 and the translator 64.

Before any motion takes place in the x direction, the system 58 is very stiff to forces in the y direction. This is because the flexing beams 14, 16, 22 and 24 are straight beams and must buckle in order to allow motion in the y direction. However, the system is more susceptible to forces in the y direction after some displacement of the translator 64 has occurred from the condition shown in FIG. 4. A displaced translator 64 is represented in FIG. 5. Electrostatic forces that urge the translator 64 laterally cause the two rigid floating beams 12 to move more closely together, as indicated by the difference between the dotted lines and the solid lines representing the rigid floating beams. Because of the displacement of the rigid floating beams relative to the anchored supports 18 and 20, a lateral force Fy exerts a moment M as indicated in FIG. 5. The two floating rigid beams are moved in the positive x direction, but the lower beam is also moved in the positive y direction, while the upper beam is moved in the negative y direction.

In the displaced condition of FIG. 5, the flexible beams 14, 16, 22 and 24 are curved. The system is now more susceptible to unwanted displacement in the y direction.

Similar to the in-plane stiffness, the out-of-plane stiffness (i.e., stiffness that is perpendicular to both the x and y axes) depends on the beam displacement. Considering a single one of the flexible beams 14, 16, 22 and 24, the beam can be made extremely stiff with respect to out-of-plane (i.e., z axis) displacements by fabricating the beam with a large aspect ratio ($\alpha$) equal to the thickness-to-width ratio (t/w). The beam allows displacements along the x axis by bending perpendicularly with respect to its narrow width, as measured along the x axis. Unfortunately, as the flexible beam is bent, the out-of-plane stiffness $k_z$ is significantly reduced. It has been theorized that the $k_z$ can be related to the in-plane stiffness $k_x$ as follows:

$$k_x/k_z = 1/\alpha^2 + A(\delta x/L)^2 \qquad \text{Eq. 1}$$

where A≈0.280 for aspect ratios greater than 10 and $\delta x$ is the amount of displacement along the x axis. When the beam is not displaced, $\delta x$ will be 0 and $k_z$ will be much larger than $k_x$. As the beam is displaced, the out-of-plane stiffness is reduced as the square of the displacement period. For a 40:1 aspect ratio beam, a lateral displacement of only 5% of the flexure length causes $k_z$ to be reduced by approximately 50%. The stiffness reduction occurs until the bending beam can no longer counteract the out-of-plane force of the actuator drive. The available lateral travel is therefore limited by the reduction in $k_z$ with lateral displacement.

As can be seen from Equation 1, it is possible to increase the lateral travel by increasing the lengths of the flexible beams. However, for many applications, it is important to locate the actuators as closely together as possible. Increasing the beam lengths requires the neighboring actuators to be spaced further apart. Therefore, it is more desirable to increase the range of lateral travel without increasing the beam lengths.

The above-identified patent to Hoen et al. describes a technique for offsetting the attractive force that is generated as a result of electrostatically driving the translator. FIG. 6 is a bottom view of a translator 66 which is supported at its four corners by folded beam flexures 68, 70, 72 and 74. Referring specifically to the flexure 68, the device includes outer flexible beams 76 and 78 that are anchored to the stator (not shown) and an inner flexible beam 80 that is connected to the translator. All three of the flexible beams have ends that connect to a floating rigid beam 82 of the type described above. The technique for at least partially offsetting the attractive force that is generated by interaction of translator drive electrodes 84 with the stator drive electrodes (not shown) is to include levitator electrodes 86 on both the translator and the stator. Only eight translator levitator electrodes are shown in FIG. 6, but typically a larger number of such electrodes are included. The electrical connections to the levitator electrodes are shown in FIG. 7. An alternating pattern of voltage high and voltage low states is established along the levitator electrodes of the translator 66. A corresponding alternating pattern is established along the levitator electrodes 88 of the stator 90. Consequently, the translator is repulsed from the stator, providing levitation force.

For the purpose of clarity, the operation of the drive electrodes will be briefly described with reference to FIG. 8. The voltage pattern along the drive electrodes 84 of the translator 66 is fixed. While not critical, the voltage pattern is preferably an alternating pattern of electrical high and electrical low. On the other hand, the voltage pattern along the drive electrodes 92 of the stator 90 is varied to induce the in-plane movement along the x axis. The applied voltages generally alternate, but include a "disruption" in the alternating pattern. In FIG. 8, the disruption occurs at electrodes 94 and 96, since these adjacent electrodes are both tied to electrical high. By moving the disruption along the x axis, the translator 66 will be moved to a new equilibrium position, thereby providing the desired translator displacement.

As is clear from FIG. 8, the voltage patterns along the drive electrodes 84, 92, 94 and 96 will generate attractive forces. The levitator electrodes 86 and 88 of FIG. 7 are aligned parallel to the direction of travel, so that the relative electrode positions remain fixed as the translator 66 is displaced in a direction perpendicular to the drive electrodes. By placing the appropriate voltages on the levitator electrodes, it is possible to mitigate, and in some cases completely counteract, the attractive force produced by the drive electrodes. Thus, the levitator electrodes significantly ease the limits imposed on translator travel as a result of the previously described reductions in out-of-plane stiffness $k_z$.

Unfortunately, the addition of the levitator electrodes 86 and 88 has the secondary effect of increasing the stiffness requirements with respect to in-plane displacements normal to the direction of travel, i.e., displacements along the y axis. The increase with regard to in-plane stiffness is apparent from FIG. 7. The desired repulsive forces are achieved by aligning the high voltage electrodes 86 of the translator 66 with the high voltage electrodes 88 of the stator 90. Without sufficient in-plane stiffness along the y axis, the desired alignment will be lost.

What is needed is an actuator that satisfies in-plane stiffness and out-of-plane stiffness requirements and provides a desired electrical relationship to enable a long range of motion without jeopardizing stability.

SUMMARY OF THE INVENTION

At least one flexure that is continuously flexible from a first end anchored to a stationary member to a second end fixed to a movable member may be combined with a levitation scheme to provide an actuator with a long range of motion. In the preferred embodiment, the flexures that are continuously flexible between their ends are of equal length and, at least in the most preferred embodiment, are straight beam flexures. Straight beam flexures are at least one order of magnitude stiffer than folded beam flexures. This greater stiffness enables longer ranges of travel.

In one preferred embodiment, the movable member is a translator of an electrostatic surface actuator which provides generally straight-line motion. The translator is supported by four straight beam flexures. The flexures are of equal length and extend in the same direction from a rigid connection to the translator. As the translator moves laterally along the x axis, each flexure bends, causing the translator to be displaced an amount δy in the y direction. This displacement is related to the lateral movement δx and the beam length L as follows:

$$\delta y \cong 0.6 \delta x^2 / L \qquad \text{Eq. 2}$$

Because the beams are the same length, the orientation of the translator does not change as it is displaced. Moreover, even though the beams are bent, the beams remain extremely stiff with respect to forces in the y direction.

Both the translator and the stator include arrays of drive electrodes and levitator electrodes. The drive electrodes are physically configured and electrically manipulated in the same manner described with reference to FIG. 9. However, the levitator electrodes are configured in an unconventional manner. Preferably, the pitch of the levitator electrodes on the translator is different than the pitch of the levitator electrodes on the stator, with the pitch being defined as the average center-to-center distance between the electrodes. There may be 2n±1 electrodes in a repeating group of stator levitator electrodes for every 2n translator levitator electrodes. In this configuration, a strictly alternating voltage pattern is applied to the translator levitator electrodes, while a disruption in the alternating pattern is applied along the stator levitator electrodes. Unlike the drive electrodes, the voltage pattern along the stator levitator electrodes is selected so that most translator levitator electrodes are positioned in alignment with stator levitator electrodes biased at the same voltage. The levitator electrodes then produce a force pushing the translator away from the stator. In the most preferred embodiment, the translator pitch is smaller than eight times the distance g between the translator and stator. This pitch-to-distance arrangement provides both a large drive force and a large levitating force.

In this first embodiment, the drive electrodes are used to step the translator in the desired x direction of travel. As the translator is displaced in the x direction, the bending of the straight beams causes the actuator to also move in the y direction. The y displacement δy depends quadratically on the x displacement δx. Typically, the y displacement is parallel to the drive electrodes and is much smaller than the drive electrode length, so that the drive method is not affected by the displacement. However, the y displacement does cause the levitator electrodes to move relative to each other. To accommodate this movement, the voltage pattern on the stator levitator electrodes is preferably stepped, keeping the desired alignment of opposing voltages for the two arrays of levitator electrodes.

In a second embodiment, the translator is supported by four continuously flexible beams that are curved when in a relaxed condition. That is, the beams are pre-bent. This reduces the available travel in one direction along the x axis, but doubles the possible throw in the opposite direction, which may be desirable in some applications. The physical and operational arrangements of the drive electrodes and the levitator electrodes of the first embodiment apply equally to this second embodiment. One method of producing precurved beams is to use curved masks in the etching of the beams.

In a third embodiment, the translator is mounted for rotation about an axis that is intersected by the only straight beam flexure that is used to support the rotary translator. While not critical, the actuator is designed to rotate about an axis that is located at approximately 80% of the length of the straight beam flexure (i.e., 20% of the length as measured from the anchoring of the flexure to the stator). Folded beam flexures or other non-straight flexures are used to support the outer edge of the translator. In this embodiment, the drive electrodes extend along radial lines from the rotational axis, but are operated in the same manner as the straight-line embodiments described above. The levitator electrodes are curved and have a common center at the rotational axis. Also in this embodiment, the levitator electrodes do not require voltage pattern stepping, since the relative positions of the levitator electrodes of the two arrays remain fixed as the translator is moved.

DETAILED DESCRIPTION

Figure 9:
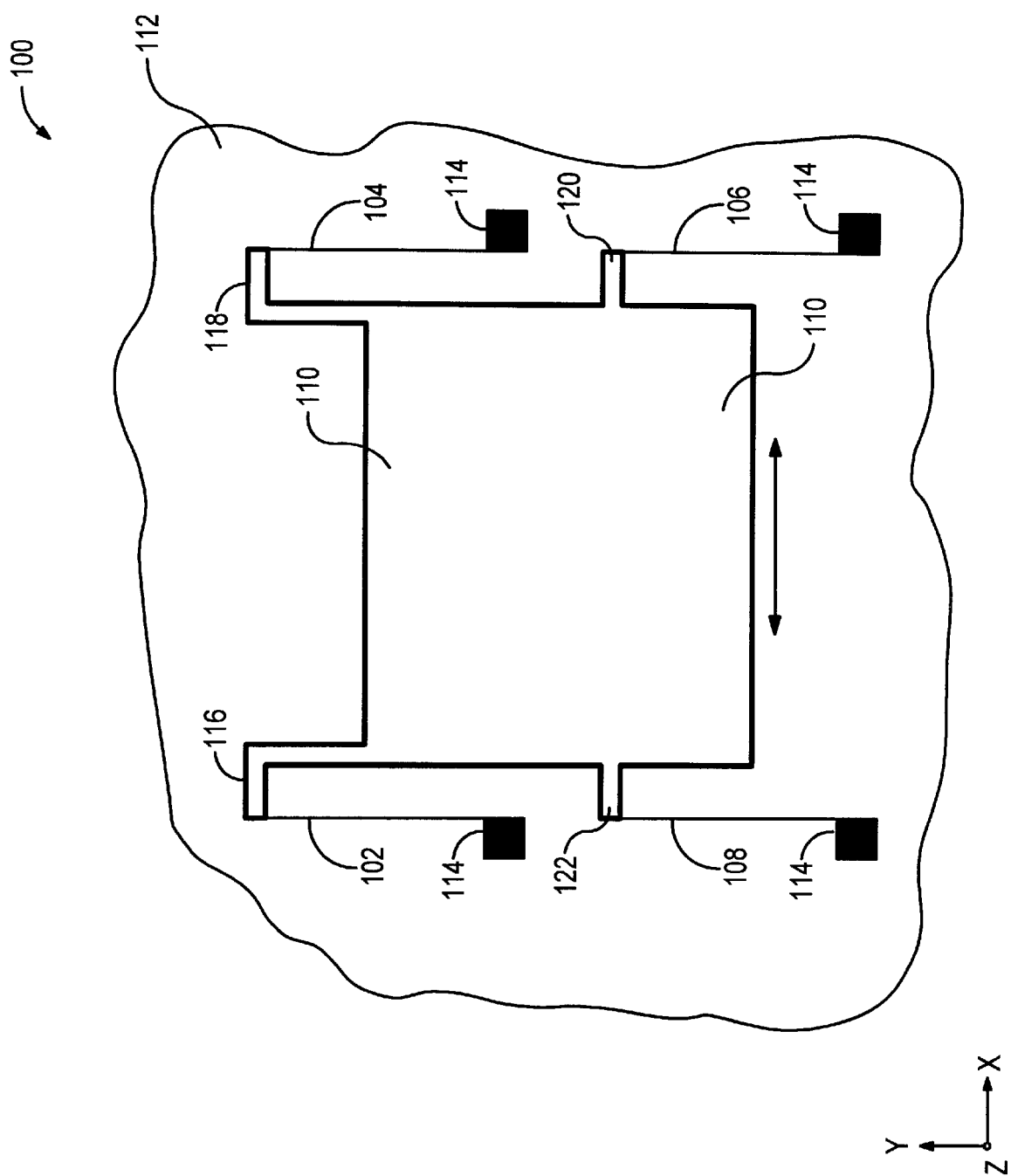
FIG. 9 is a top view of a surface drive translator having straight beam flexures in accordance with one embodiment of the invention.

With reference to FIG. 9, a top view of an actuator 100 in accordance with the first embodiment of the invention includes four straight beam flexures 102, 104, 106 and 108 for supporting a translator 110 to be moved relative to a stator 112. While not critical, the stator 112 may be a semiconductor wafer and the flexures and translator may be patterned materials that are fabricated using known micromachine fabrication techniques, such as reactive ion etching.

Each of the straight beam flexures 102, 104, 106 and 108 is formed of a material and has a sufficient width to allow the flexure to be easily bent. For micromachining applications, the widths (as measured along the x axis in FIG. 9) may be in the order of 1 µm to 3 µm. Each of the flexures is anchored at a first end to a support 114 on the stator 112. The second ends of the flexures are connected to rigid arms 116, 118, 120 and 122 of the translator 110. The arms 116 and 118 are configured as an inverted and backward "L" in order to provide sufficient distance for the flexures 102 and 104 to extend in the same direction and length as the other two flexures 106 and 108. Since the arms 116 and 118 are rigid, the flexing operations from the supports 114 to the body of the translator 110 will be materially different than those of a folded beam flexure.

Figure 2:
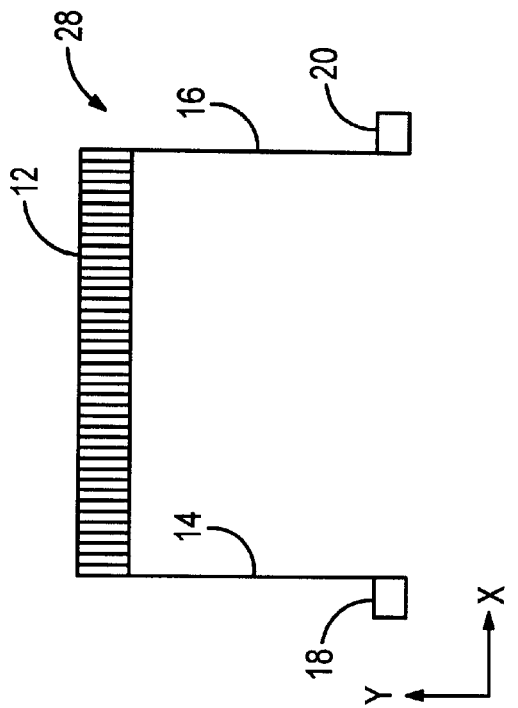
FIG. 2 is a top view of a second embodiment of a known flexural device.
Figure 1:
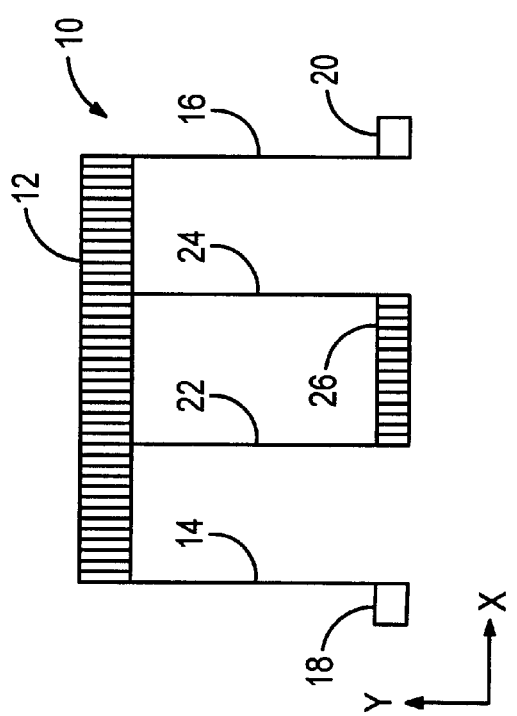
FIG. 1 is a top view of a folded beam flexure in accordance with the prior art.
Figure 3:
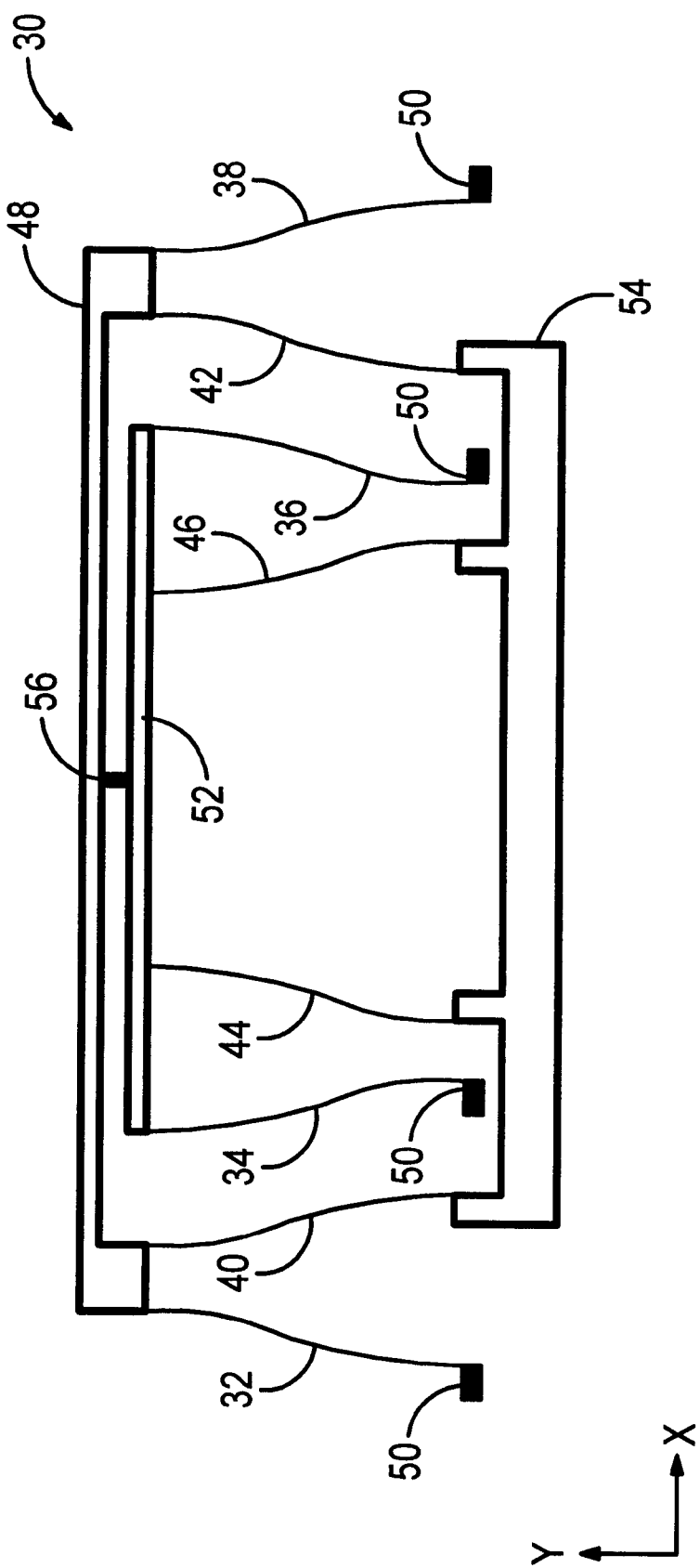
FIG. 3 is a known flexural device that is designed to reduce a tendency to rotate as lateral movement is induced.
Figure 4:
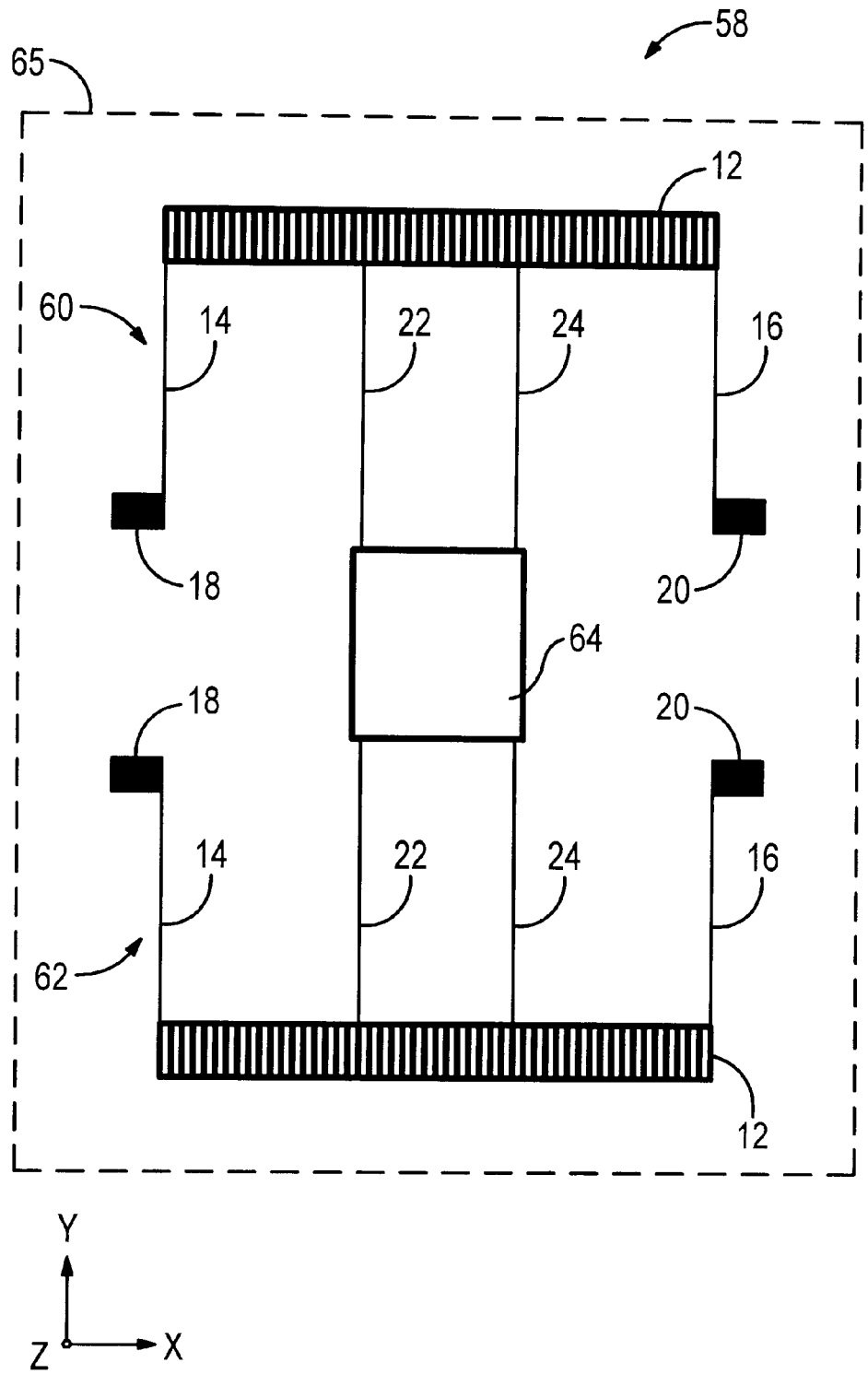
FIG. 4 is a top view of an actuator that uses folded beam techniques to support a translator, with the actuator being shown in a relaxed condition.
Figure 5:
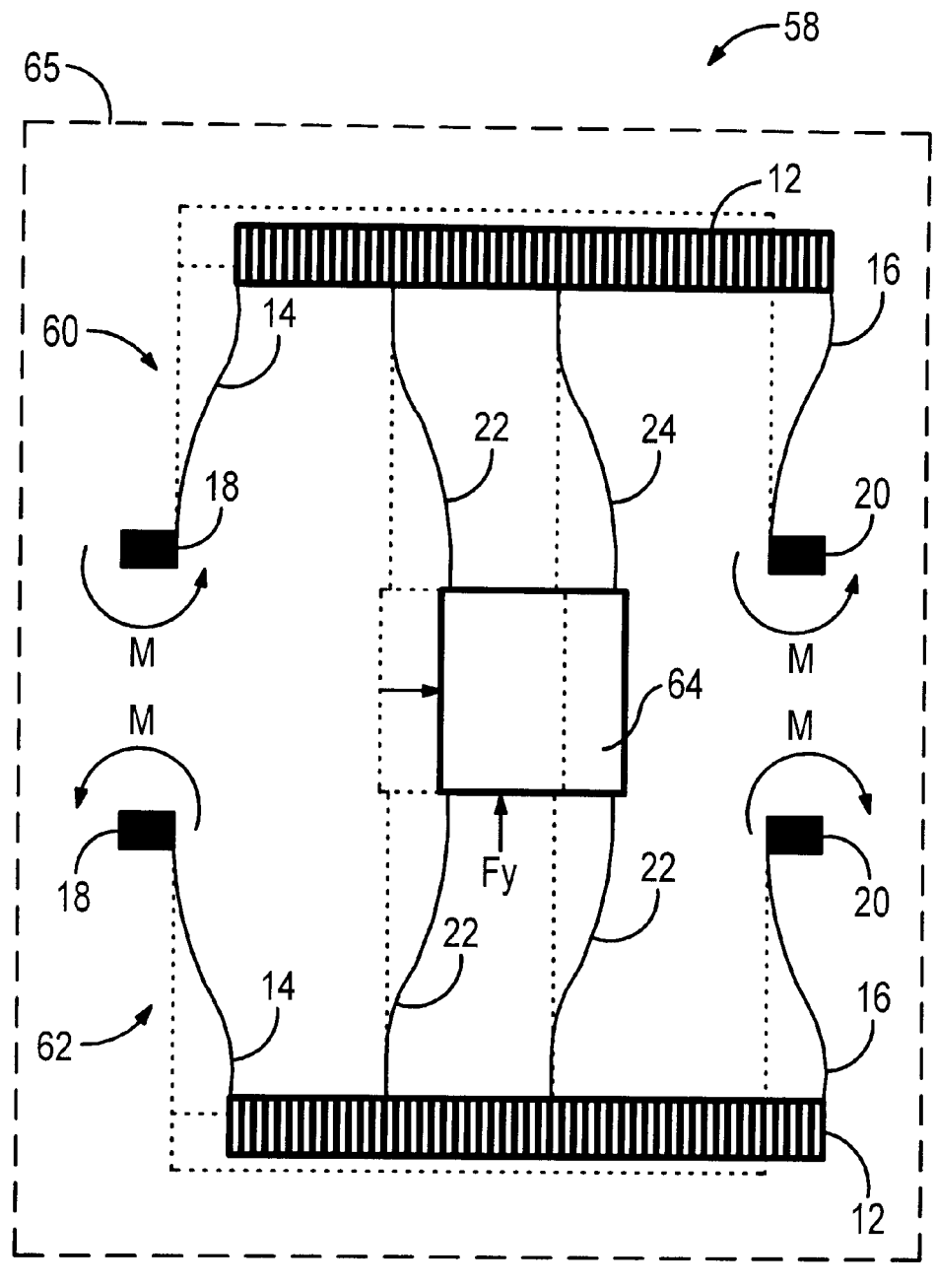
FIG. 5 is a top view of the actuator of FIG. 4 after the translator has been displaced.
Figure 6:
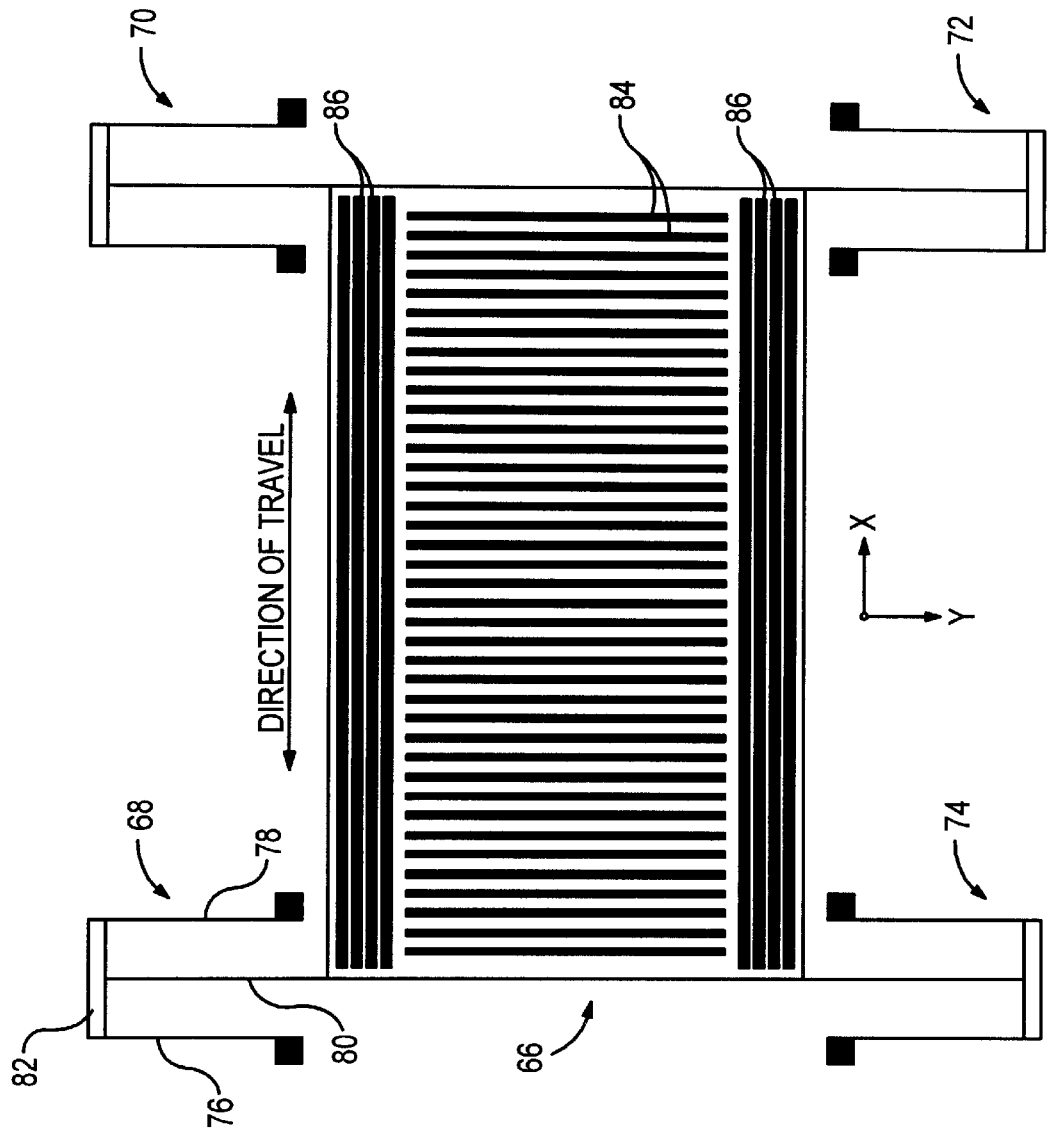
FIG. 6 is a bottom view of a translator supported by four folded beam flexures, with the drive electrodes and the levitator electrodes being exposed on the bottom surface of the translator.
Figure 7:
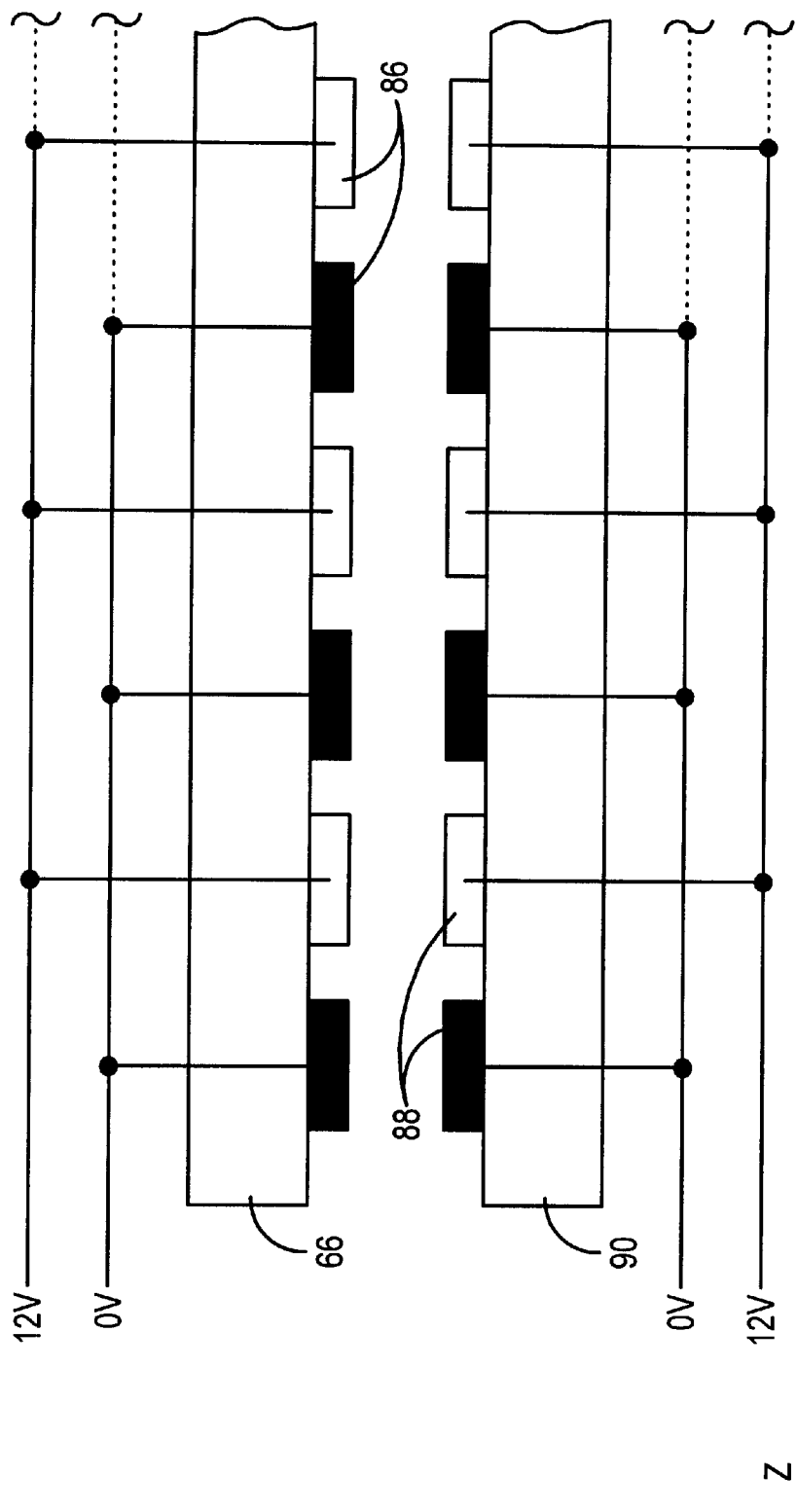
FIG. 7 is a representation of the voltage patterns for driving the levitator electrodes in accordance with the prior art.

As previously noted, when a flexible beam is bent, the out-of-plane stiffness $k_z$ is significantly reduced and is theoretically related to the in-plane stiffness $k_x$ as follows:

$$k_x/k_z = 1/\alpha^2 + A(\delta x/L)^2 \qquad \text{Eq. 1}$$

where A≈0.280 for aspect ratios greater than 10. Similar to the out-of-plane stiffness, the in-plane stiffness $k_y$ that is perpendicular to the desired direction of travel depends on the beam displacement. The folded beam flexures of FIG. 5 have a large $k_y$ when they are not displaced. Unfortunately, $k_y$ is known to be rapidly reduced as displacement occurs. Researchers have shown that:

$$k_x/k_y \cong (w/L)^2 + (3/8)(\delta x/L)^2 \qquad \text{Eq. 3}$$

Comparing Eq. 1 to Eq. 3, $k_y$ is initially larger than $k_z$, but decreases more rapidly as the beams are displaced. For large aspect ratio folded beam flexures, the greatest available displacement is determined by the softening in $k_y$.

Straight beam flexures offer an alternative means of support. The straight beam flexures exhibit less softening in $k_y$ than the folded beam flexures. Modeling studies show that for a straight beam deflecting in the intended manner:

$$k_x/k_y \cong (w/L)^2 + (0.018)(\delta x/L)^2 \qquad \text{Eq. 4}$$

It follows that the straight beam flexures are more than 20 times stiffer than the folded beam flexures. The increased stiffness allows larger travel.

In the embodiment of FIG. 9, the four straight beam flexures 102, 104, 106 and 108 that support the translator 110 over the stator 112 will bend as the translator is caused to move along the x axis. The bending will cause the translator 110 to be displaced by an amount δy in the y direction. The displacement is related to the lateral movement δx and the beam length L by Eq. 2 given above as:

$$\delta y \cong 0.6 \delta x^2/L \qquad \text{Eq. 2}$$

However, because the beams are of the same length, the orientation of the translator does not change as it is moved. As indicated by Eq. 4, even though the beam flexures 102, 104, 106 and 108 are bent, the beams are extremely stiff with respect to forces in the y direction.

The flexure design of FIG. 9 would not be suitable for a conventional comb drive, since the displacement in the y direction would cause the comb fingers that are attached to the translator to contact the comb fingers of the stator. An electrostatic surface drive is ideally suited for the flexure design.

Figure 10:
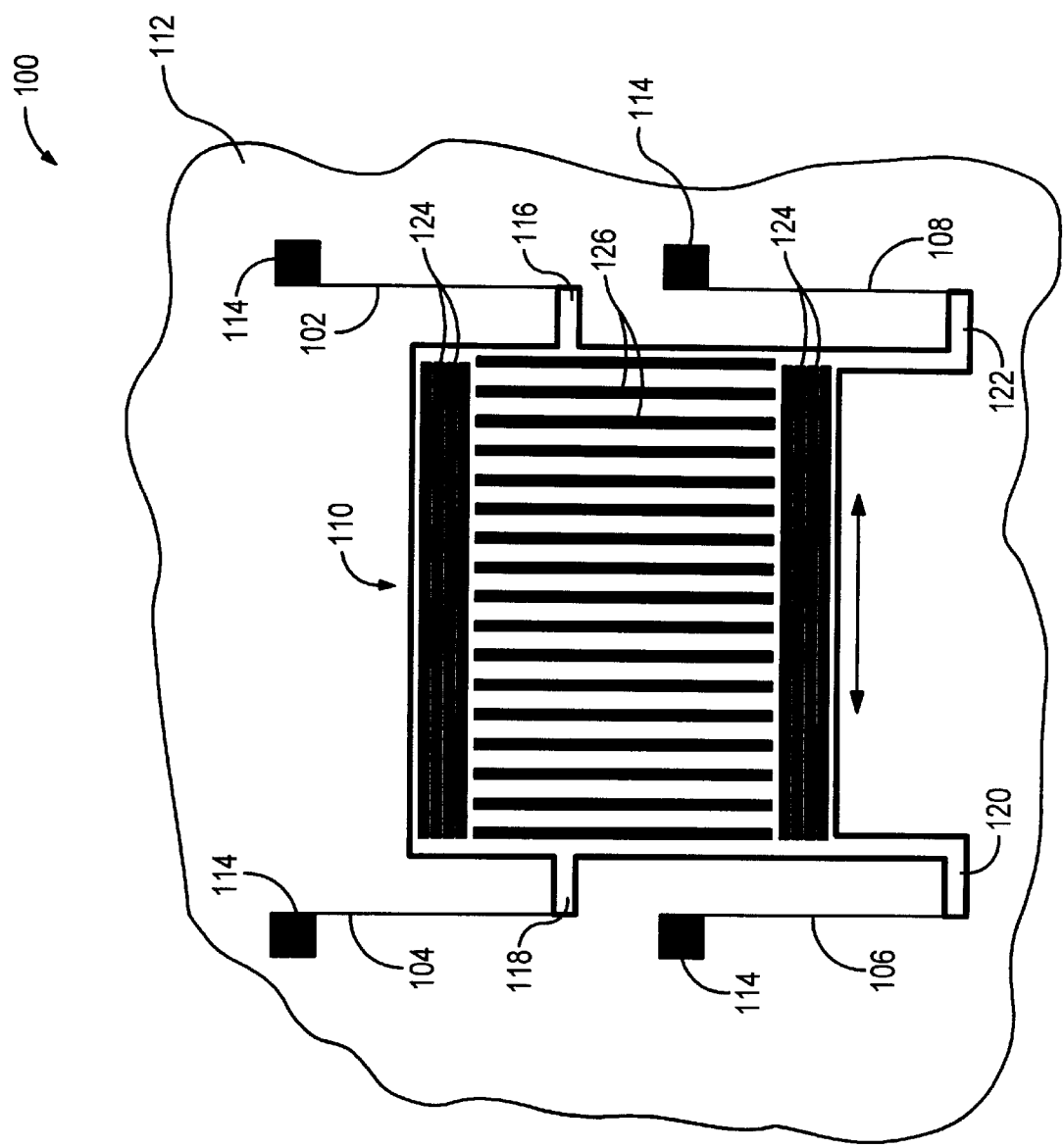
FIG. 10 is a bottom view of the translator of FIG. 9, showing levitator electrodes and drive electrodes.
Figure 10:
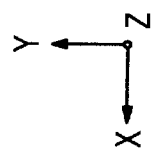
Figure 11:
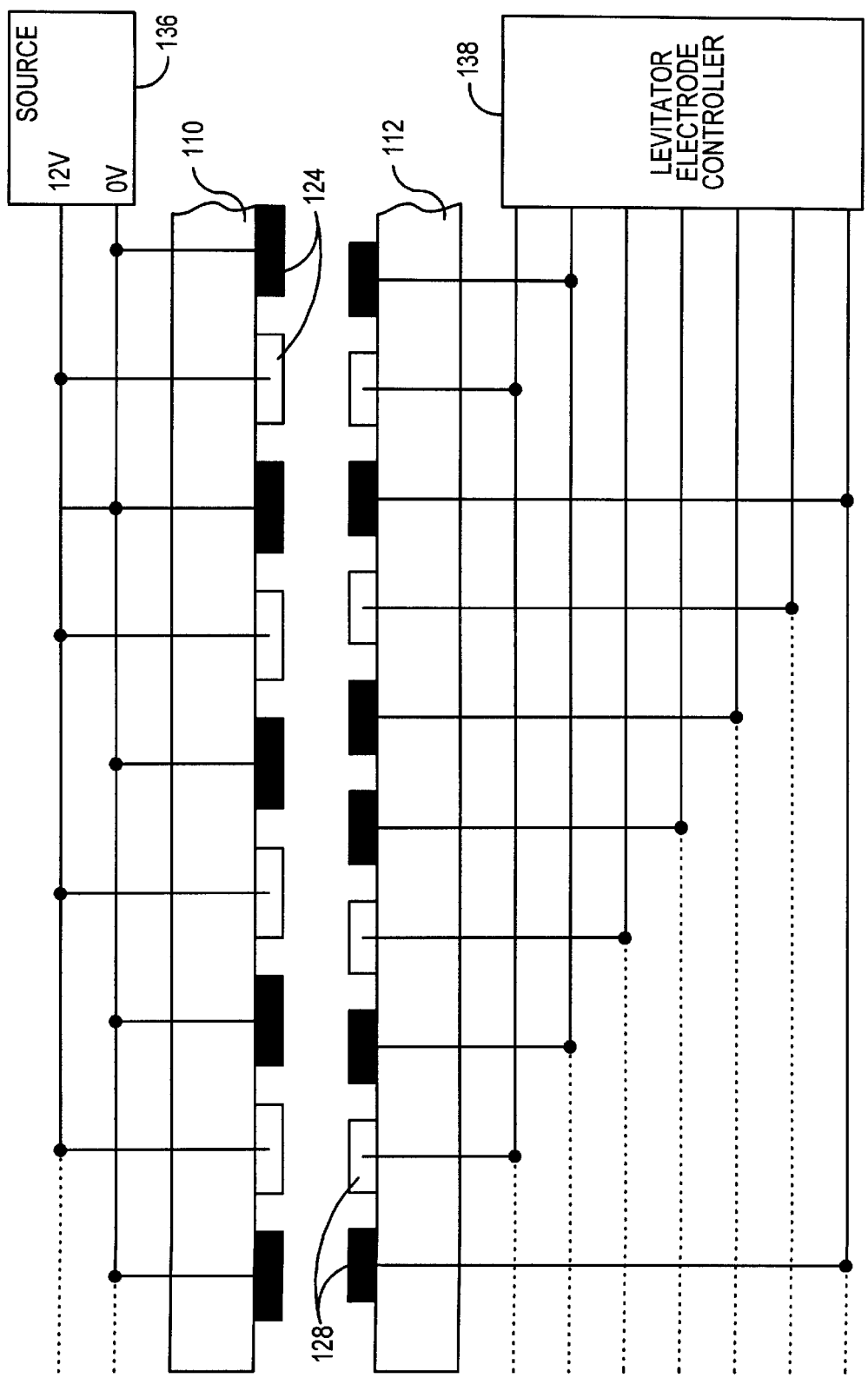
FIG. 11 is a side representation of connectivity to the levitator electrodes of the actuator of FIG. 9.
Figure 12:
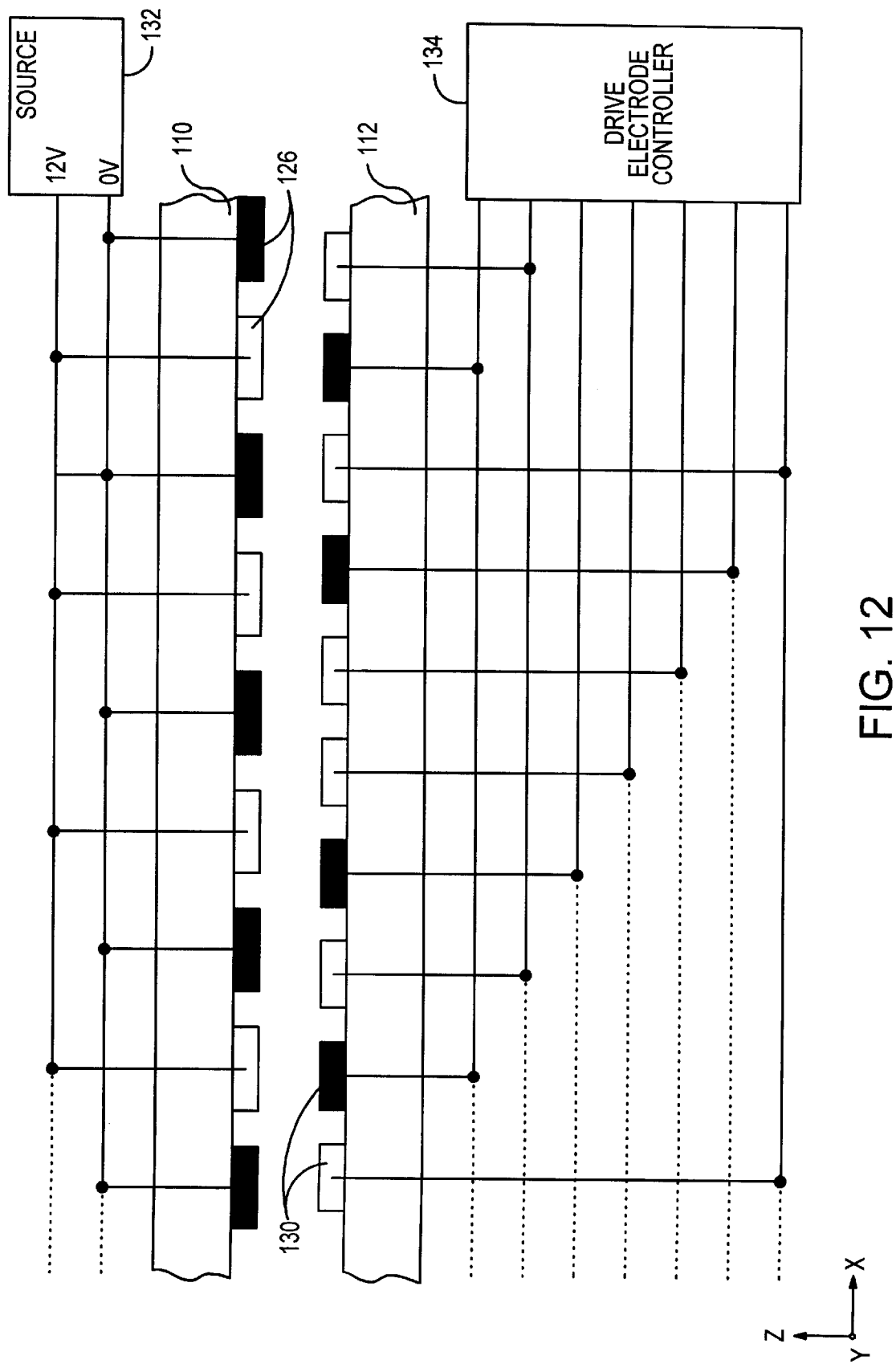
FIG. 12 is a side representation of connectivity to the drive electrodes of the actuator of FIG. 9.

Referring now to FIG. 10, the underside of the translator 110 is shown as including two sets of levitation electrodes 124 on opposite sides of drive electrodes 126. The drive electrodes extend perpendicular to the direction of travel and to the levitator electrodes, but are parallel to the straight beam flexures 102, 104, 106 and 108. The electrodes may be formed of a conductive material and may be formed using known techniques. A side view of the levitator electrodes 124 is shown in FIG. 11. The stator 112 also includes levitator electrodes 128. In FIG. 12, the drive electrodes 126 of the levitator are shown as being adjacent to drive electrodes 130 on the stator 112.

Figure 8:
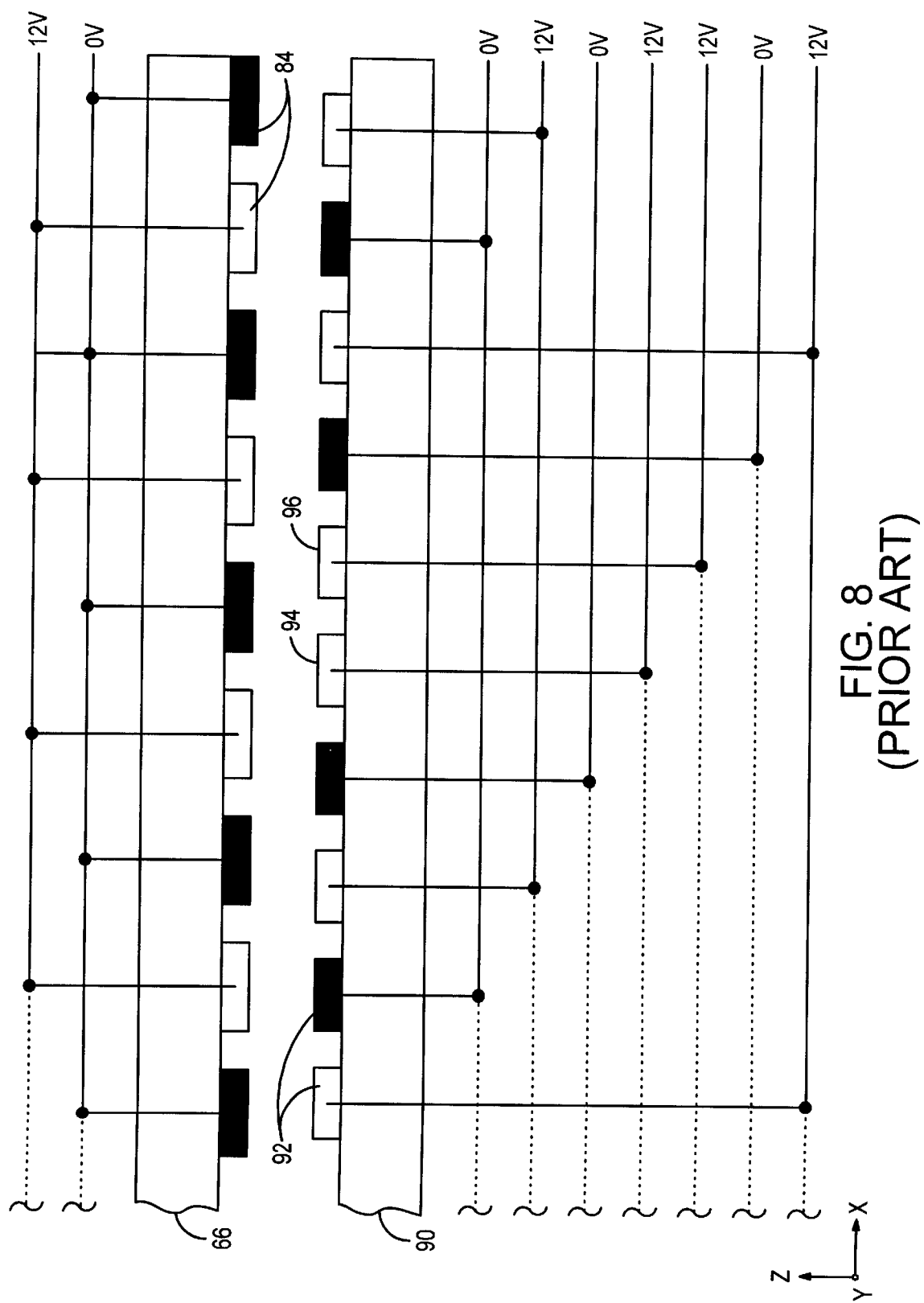
FIG. 8 is a schematic representation of the voltage patterns along the drive electrodes of FIG. 6 in accordance with the prior art.

The drive electrodes 126 and 130 of FIG. 12 are configured with voltage patterns that are similar or identical to those described with reference to FIG. 8. There are 2n±1 drive electrodes 130 in a repeating group of stator drive electrodes for every group of 2n drive electrodes 126 on the translator 110. A strictly alternating voltage pattern may be applied to the drive electrodes 126 on the translator 110. In FIG. 12, the alternating pattern is established by connections to a voltage source 132. While not critical, the spatially alternating pattern of applied voltages is shown as being a pattern in which a given electrode that is held at 12 volts has nearest neighboring electrodes that are held at 0 volts. A similar voltage pattern is applied to drive electrodes 130 on the stator 112, but because the stator has an odd number of drive electrodes in each repeating group, there is always a disruption of the alternating pattern of voltages. In FIG. 12, the disruption occurs at the center of the illustrated drive electrodes 130. The pattern is provided by a drive electrode controller 134. To displace the translator 110, the disruption (as well as the other disruptions along the voltage pattern) is moved in one direction or the other. To move the disruption, one of the electrodes in the same-voltage pair may be switched from 12 volts to 0 volts. The disruption would then be formed by a pair of adjacent electrodes that are both biased at 0 volts. By stepping the disruption to the right, the translator 110 is displaced to the left. The displacement step size is determined both by the electrode pitch along the translator and by the number of stator drive electrodes in one group (i.e., by the number=2n±1). Specifically, the displacement step size is the translator electrode pitch divided by the number of stator electrodes in a group. For example, if the translator pitch is one micron and the stator group size is seven, a single step of the voltage pattern causes the translator to move by 0.143 microns. However, this is not critical.

In contrast to the drive electrodes, the levitator electrode arrangement of FIG. 11 is inconsistent with the prior art levitator arrangements. The levitator electrodes 124 along the translator 110 continue to follow the alternating pattern, as applied by a voltage source 136. However, the levitator electrodes 128 along the stator 112 are configured similarly to the drive electrodes 130 along the stator, except that the voltages that are applied to the stator levitator electrodes 128 are selected to oppose the voltages on the translator levitator electrodes 124. This is shown schematically in FIG. 11, wherein the voltage pattern on the stator 112 is selected so that most translator levitator electrodes are positioned above stator levitator electrodes of the same voltage. As in FIG. 12, the filled electrodes represent electrodes that are at least temporarily at 0 volts, while the remaining electrodes represent a high voltage state at the electrodes. As a result of the combination of the support provided by the straight beam flexures and the voltage patterns shown in FIG. 11, the translator 110 is spaced apart from the stator 112 by a gap g. The pitches (as determined by an average center-to-center difference among electrodes in an array) for each of the four different arrays of electrodes 124, 126, 128 and 130 of FIGS. 11 and 12 should be less than eight times the gap g in order to provide a large drive force and a large levitating force.

Referring now to FIGS. 9–12, the drive electrodes 126 and 130 are used to step the translator 110 in the desired direction of travel. As the translator is displaced in the x direction, the straight beam flexures 102, 104, 106 and 108 bend, causing the translator to move in the y direction as well. The y displacement δy depends quadratically on the displacement δx, as shown by Eq. 2. For most cases, the y displacement is parallel to the drive electrodes and is much smaller than the length of the drive electrodes, so that the drive operation is not affected by the displacement. However, the y displacement does cause the levitator electrodes to move relative to each other. In order to accommodate this movement, the voltage pattern along the levitator electrodes 128 on the stator 112 is stepped by a levitator electrode controller 138. By periodically stepping the levitator electrodes 128, the arrangement of opposing voltages may be maintained despite the y displacement.

Figure 13:
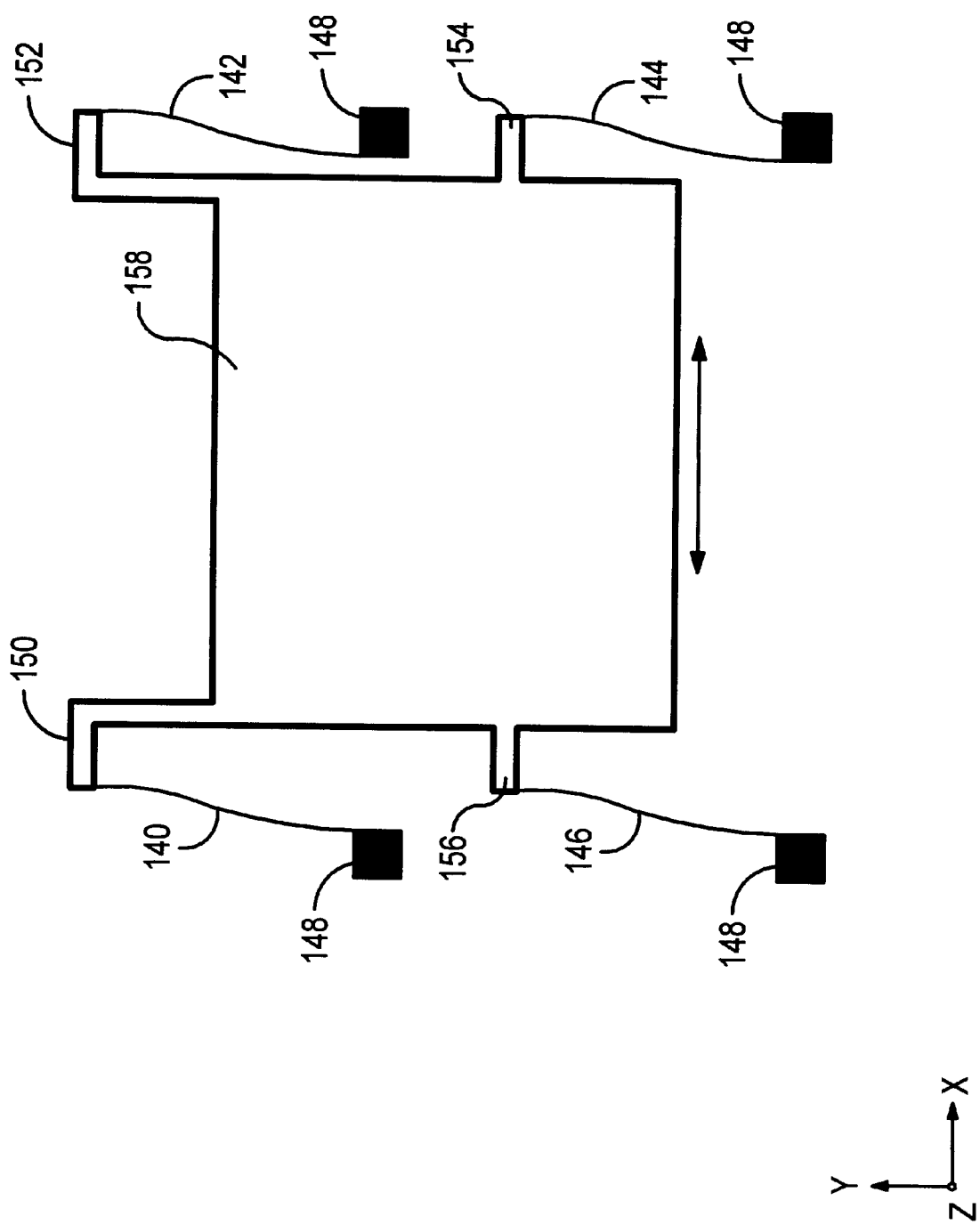
FIG. 13 is a top view of a second embodiment of the invention.

FIG. 13 is a top view of another embodiment of the invention. This embodiment may be identical to the one described with reference to FIG. 9, but includes pre-bent beam flexures 140, 142, 144 and 146. The flexures connect to stator supports 148 at a first end to rigid arms 150, 152, 154 and 156 at the opposite ends. The rigid arms are extensions from a translator 158 that is supported by the flexures in a position spaced apart from a stator, not shown. The translator 158 and the stator include drive electrodes and levitator electrodes (not shown) of the types described with reference to FIGS. 11 and 12.

The curvature of the pre-bent beam flexures 140–146 biases the translator 158 in the positive x direction. While this reduces the available travel in the positive x direction, it doubles the possible throw in the negative x direction. This may be beneficial in some applications.

Figure 14:
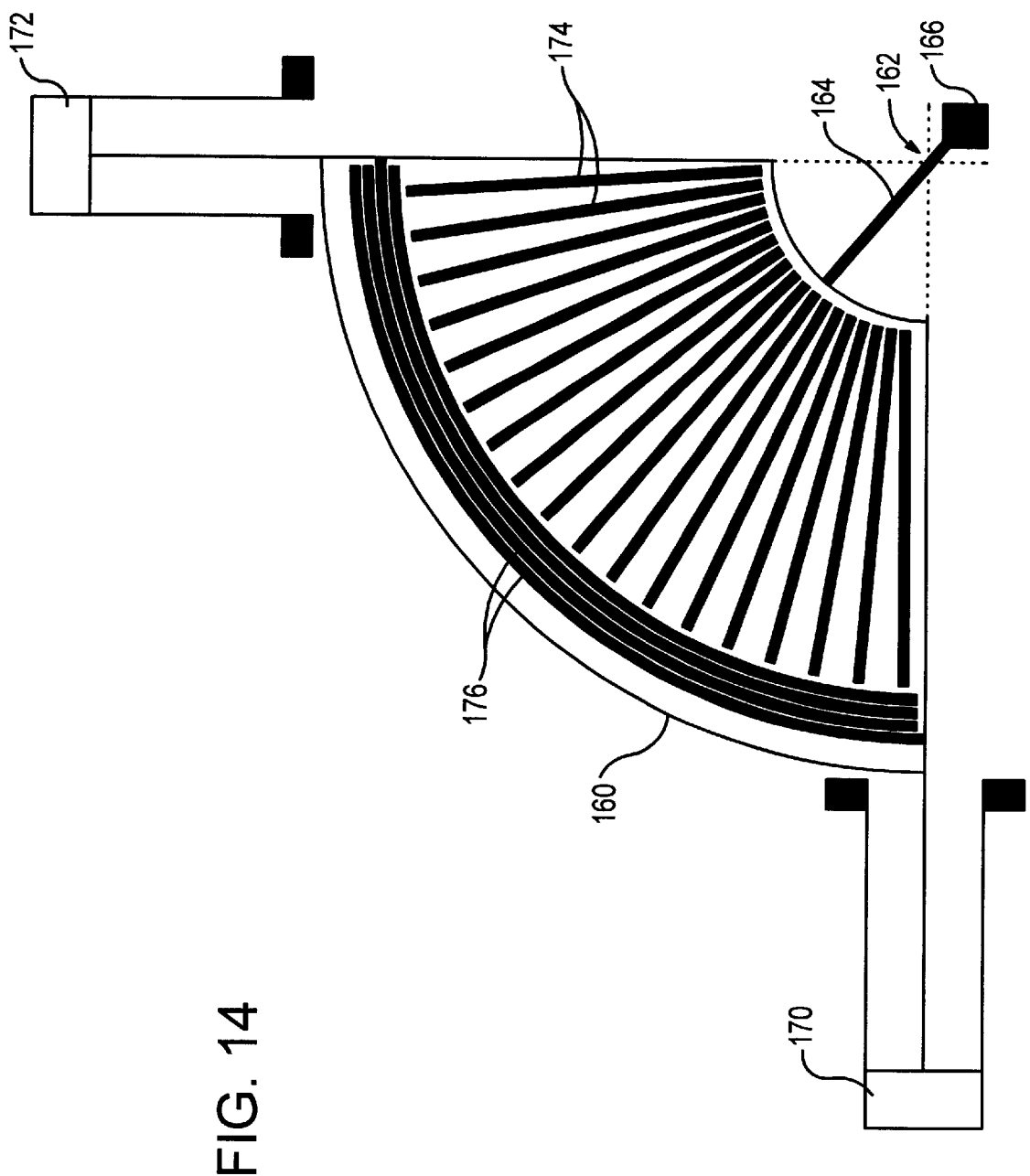
FIG. 14 is a top view of a rotary translator in accordance with a third embodiment of the invention.

A third embodiment of the invention is shown in FIG. 14. In this embodiment, a translator 160 is allowed to rotate about an axis of rotation 162. The embodiment includes one and only one straight beam flexure 164. The flexure has a first end anchored to a support 166 on a stator 168, which may be a semiconductor substrate. The outer edge of the rotatable translator 160 is shown as being supported by folded beam flexures 170 and 172, but other types of flexures with a large lateral compliance may be used to support the outer edge of the translator.

The actuator of FIG. 14 is constructed such that the sole straight beam flexure 164 intersects the rotational axis 162. In the preferred embodiment, the rotational axis is located at approximately 80% of the length of the straight beam flexure 164, as measured from the translator 160.

The translator 160 includes drive electrodes 174 and levitator electrodes 176. While the electrodes 174 and 176 are visible in the top view of FIG. 14, it should be understood that the translator electrodes are on a surface of the translator that faces the surface of the stator 168 on which corresponding arrays of drive and levitator electrodes are formed.

The drive electrodes 174 are positioned in radial alignment with the rotational axis 162. Drive electrodes on the stator 168 are similarly aligned. While not shown in FIG. 14, the electrodes on the stator may extend beyond the sides of the translator 160, so that the electrodes are available when the translator is rotated into a position above those electrodes. The levitator electrodes 176 of the translator have a curvature that is based upon the rotation of the translator. The stator 168 also includes levitator electrodes. As with the drive electrodes, the levitator electrodes on the stator may extend beyond the edges of the translator, so that the distribution of forces remains intact as the translator is rotated.

In operation, the translator 160 is caused to rotate in the same manner that lateral displacement is induced in the embodiments described above. That is, local disruptions in the voltage pattern along the drive electrodes of the stator 168 are stepped in one direction in order to drive the translator 160 in the opposite direction. Regarding the levitator electrodes, it is not necessary to step the voltage pattern that is applied to the stator levitator electrodes, because the relative positions of the two arrays of levitator electrodes are maintained as the translator rotates about the rotational axis 162.

Referring again to FIG. 9, another embodiment of the invention would provide two generally straight beam flexures that support one side of the translator 110 and would include a third straight beam flexure supporting the opposite side. The important factor in determining the support arrangement of the three flexures is that the bending of the three flexures should cause off-axis movement in the same direction. That is, the flexures should all provide movement in either the negative y direction or the positive y direction as the translator is moved in a particular direction. This provides a predictable y axis displacement, so that the voltage pattern along the levitator electrodes of the stator may be stepped accordingly.

What is claimed is:

1. An actuator comprising:
a stationary member having a first array of drive electrodes and a first array of levitator electrodes;
a movable member having a second array of drive electrodes positioned with respect to said first array of drive electrodes to initiate movement of said movable member in response to variations in a voltage pattern along at least one of said first and second arrays of drive electrodes, said movable member having a second array of levitator electrodes positioned with respect to said first array of levitator electrodes to bias said movable member apart from said stationary member in response to applied voltage patterns along said first and second arrays of levitator electrodes, said movable member being spaced apart from said stationary member by a distance g, said first and second arrays of drive electrodes having first and second pitches defined by average center-to-center spacings between said drive electrodes, said first and second pitches being a maximum of eight times said distance g; and
a plurality of flexures connecting said movable member to said stationary member, at least one of said flexures being continuously flexible from a first end that is fixed relative to said stationary member to a second end that is fixed relative to said movable member, each said flexure having a first end anchored to said stationary member and having a second end fixed to said movable member, wherein a direction from said first end of one of said flexures to said second end of said flexure is the same as all other said flexures.

2. The actuator of claim 1 wherein said plurality of flexures includes four flexures which are continuously flexible from said first ends anchored to said stationary member to said second ends fixed to said movable member, said flexures having end-to-end configurations and attachments to limit displacement of said movable member in a direction perpendicular to said drive electrodes.

3. The actuator of claim 2 wherein said first and second arrays of levitator electrodes have third and fourth pitches defined by an average center-to-center spacing between said levitator electrodes, said third and fourth pitches being dissimilar.

4. The actuator of claim 3 wherein said first and second arrays of levitator electrodes have dissimilar patterns of applied voltages.

5. The actuator of claim 2 wherein each of said four flexures is substantially straight between said first and second ends when said four flexures are mechanically relaxed, said four flexures being generally parallel with said drive electrodes.

6. The actuator of claim 5 wherein said four flexures include first and second flexures attached to first and second corners of said movable member and include third and fourth flexures attached to opposite sides of said movable member at locations spaced apart from corners of said movable member.

7. The actuator of claim 2 wherein said four flexures are substantially equal in length.

8. The actuator of claim 2 wherein each of said four flexures is curved between said first and second ends when said four flexures are mechanically relaxed.

9. An electrostatic actuator comprising:
a stator having a surface with first drive electrodes and first levitator electrodes;
a translator having a surface with second drive electrodes and second levitator electrodes, said first levitator electrodes of said stator having a pitch that is different than said second levitator electrodes of said translator;
a plurality of flexures that are continuously flexible between a rigid connection to said stator and a rigid connection to said translator, said flexures supporting said translator to accommodate movement along a first path while retarding movement in directions other than along said first path;
a drive electrode controller connected to establish a varying voltage pattern along at least one of said first and second drive electrodes; and
a levitator electrode controller connected to establish voltage patterns along said first and second levitator electrodes, said levitator electrode controller being configured to maintain a preselected voltage pattern relationship between said first and second levitator electrodes, said levitator electrode controller shifting said voltage pattern along at least one of said first and second levitator electrodes in correspondence with said movement of said translator along said first path, thereby maintaining said preselected voltage pattern relationship.

10. The electrostatic actuator of claim 9 wherein said second levitator electrodes are at a non-zero angle to said first path.

11. The electrostatic actuator of claim 10 wherein said second drive electrodes remain parallel to said first drive electrodes as said translator is moved along said first path.

12. An electrostatic actuator comprising:
a stator having a surface with first drive electrodes and first levitator electrodes;
a translator having a surface with second drive electrodes and second levitator electrodes; and
a plurality of flexures supporting said translator in spaced relation to said stator, including one and only one flexure that is continuously flexible between connections to said stator and said translator, said translator being rotatable about a rotation axis in response to varying voltage patterns along at least one of said first and second drive electrodes, said rotation axis being between said connections of said stator and said translator to said one flexure that is continuously flexible.

13. The electrostatic actuator of claim 12 wherein said one flexure that is continuously flexible is straight between said connections to said translator and said stator.

14. The electrostatic actuator of claim 13 wherein said one flexure that is continuously flexible passes through said rotation axis.

15. The electrostatic actuator of claim 13 wherein said flexures include a plurality of folded flexures having rigid regions having opposite sides connected to first and second flexible legs.

16. The electrostatic actuator of claim 12 wherein said first and second drive electrodes extend along radial lines from said rotation axis, said first and second levitation electrodes being arcuate traces with a common radial center.

17. An electrostatic actuator comprising:

a stator having a surface with first drive electrodes and first levitator electrodes;

a translator having a surface with second drive electrodes and second levitator electrodes, said first levitator electrodes of said stator having a pitch that is different than said second levitator electrodes of said translator;

a plurality of flexures that are continuously flexible between a rigid connection to said stator and a rigid connection to said translator, said flexures supporting said translator to accommodate movement along a first path while retarding movement in directions other than along said first path;

a drive electrode controller connected to establish a varying voltage pattern along at least one of said first and second drive electrodes; and a levitator electrode controller connected to establish voltage patterns along said first and second levitator electrodes;

wherein a difference in said pitches of said first and second levitator electrodes is substantially equal to a difference in pitches of said first and second drive electrodes, said levitator electrode controller being configured to step said voltage pattern of at least one of said first and second levitator electrodes in response to movement of said translator.

18. An actuator comprising:

a stationary member having a first array of drive electrodes and a first array of levitator electrodes;

a movable member having a second array of drive electrodes positioned with respect to said first array of drive electrodes to initiate movement of said movable member in response to variations in a voltage pattern along at least one of said first and second arrays of drive electrodes, said movable member having a second array of levitator electrodes positioned with respect to said first array of levitator electrodes to bias said movable member apart from said stationary member in response to applied voltage patterns along said first and second arrays of levitator electrodes, said movable member being spaced apart from said stationary member by a distance g, said first and second arrays of drive electrodes having first and second pitches defined by average center-to-center spacings between said drive electrodes, said first and second pitches being a maximum of eight times said distance g; and a plurality of flexures connecting said movable member to said stationary member, at least one of said flexures being continuously flexible from a first end that is fixed relative to said stationary member to a second end that is fixed relative to said movable member, wherein said plurality of flexures support said movable member for rotation about a rotational axis defined by a single flexure that is continuously flexible from said first end anchored to said stationary member and said second end fixed to said movable member, said first and second arrays of drive electrodes being in a radial arrangement relative to said rotational axis.

19. The actuator of claim 18 wherein said single flexure is the only flexure that is continuously flexible, said single flexure being substantially straight when mechanically relaxed and passing through said rotational axis when mechanically relaxed.

20. The actuator of claim 19 wherein said levitator electrodes of said first and second arrays are curved and have a common radial center that is generally coincident with said rotational axis.

* * * * *